Patented Dec. 15, 1953

2,662,890

UNITED STATES PATENT OFFICE 2,662,890

PRODUCTS HAVING PHYSOSTIGMINE-LIKE ACTION

Emile H. Sakal, Massapequa, N. Y., assignor to Warner-Hudnut, Inc., New York, N. Y., a corporation of Delaware No Drawing. Application November 26, 1951, Serial No. 258,285

5 Claims. (Cl. 260—295)

This invention relates to new pharmaceutical products, specifically to products having powerful physostigmine-like action capable of stimulating the parasympathetic division of the nervous system.

In a recent article in New York State Journal of Medicine, 50, 1950, page 438, the pharmacological action of the compound 1-benzyl-3-(dimethylcarbamyloxy)-pyridinium bromide (U. S. Patent No. 2,489,247, dated November 22, 1949) is described; these investigators found this substance produces stimulation of smooth muscle, with strikingly low side effects. However, there is still a demand for substances exhibiting the low side effects of the above compound but with increased activity.

It is an object of this invention to provide novel substances having a high degree of physostigmine-like activity with low incidence of side effects.

In accordance with this invention, there are provided compounds of the following formula:

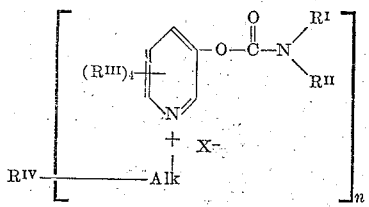

wherein $R^I$ and $R^{II}$ denote alkyl, aralkyl, aryl, halogenated aryl or hydroaryl hydrocarbon radicals, which may be the same or different and each of which preferably contains not more than 10 carbon atoms, or together may form a polymethylene radical containing not over 5 carbon atoms which may be interrupted by an oxygen, sulfur or imino group; $R^{III}$ denotes hydrogen or a lower aliphatic or araliphatic hydrocarbon radical, said members being the same or different; $R^{IV}$ denotes an aryl radical with a valence of $n$; $X^-$ denotes a quaternizing anion; Alk denotes an alkylene radical containing not over 4 carbon atoms and which may be straight chain or branched; and $n$ denotes an integer from 2 to 4. These compounds, I have found, have considerably increased physostigmine-like action as compared with compounds of Patent No. 2,489,247, while still possessing the same desirable low incidence of said effects of the patented compounds. For example, $a,a'$-(1,2-xylene)-bis-[1-(3-dimethylcarbamyloxy)-pyridinium bromide] is about five times more active than 1-benzyl-3-(dimethylcarbamyloxy)-pyridinium bromide in promoting intestinal motility, while suprisingly, having the same acute toxicity. The compounds of my invention thus have a higher therapeutic index than the compounds of the prior patent.

The compounds of my invention may be prepared by reacting a pyridol ester having the following formula:

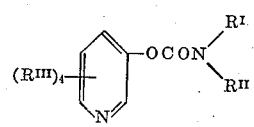

wherein $R^I$, $R^{II}$ and $R^{III}$ are as above defined, with a quaternizing halide having the following formula:

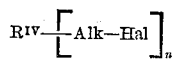

wherein $R^{IV}$, Alk and $n$ are as above defined and Hal denotes halogen. The proportion of the reagents employed should be such that at least $n$ moles of the pyridol ester are provided per mole of the quaternizing halide, preferably about $2n$ moles of pyridol ester per mole of quaternizing halide. The quaternization reaction may be carried out in the presence of a solvent preferably one, such as ethanol or an acetone-ethanol mixture in which the reactants as well as the reaction product are soluble. The reaction may be carried out at any suitable temperature, e. g., at the reflux temperature of the reaction mixture. The reaction product may be isolated either by precipitation with ethyl ether or by removal of the solvent by evaporation. If desired, the anion in the resulting quaternary halide sale may be replaced by other anions by the usual methods of anion interchange such as treatment of the said halide sale in aqueous solution with the silver salt of the appropriate acid or by allowing the solution of the said halide salt to come into contact with a suitably treated anion exchange resin.

The above pyridol esters may be prepared as described in Journal of the American Chemical Society, 73, 1951, page 1210. The quaternizing halides may be prepared as described in J. Chem. Soc. 91, 1907, page 1696; ibid., 1926, page 513; Helv. Chim. Acta., 24, 1941, page 899; ibid., 28, 1945, page 674; Bull. Chem. Soc. Japan, 11, 1936, page 19; J. Chem. Soc., 1947, page 1432; ibid., 99, 1911, page 2108; Ann. de Chim. et Phys., 6, 1885, page 86.

The following examples are illustrative of the preparation of compounds of my invention:

Example I

A solution of o-xylylene bromide (3.3 g.) in acetone (20 cc.) was added to a solution of 3-(dimethylcarbamyloxy)-pyridine (5.0 g.) in absolute ethanol (10 cc.). The resulting solution was heated under reflux for 2 hours followed by removal of the solvents by evaporation in vacuum on a water-bath. The residual white solid was dissolved in absolute ethanol (15 cc.), treated with activated carbon (0.2 g.) and the mixture was heated under reflux for 1.5 hours and filtered. The cooled filtrate was treated with ethyl ether (15 cc.), whereupon a light oil separated which recrystallized upon seeding. The white crystalline solid was collected and dried in a vacuum desiccator over concentrated sulfuric acid, whereby 7.4 g. of α,α'-(1,2-xylene)-bis-[1-(3-dimethylcarbamyloxy)-pyridinium bromide], M. P. 206° C., were obtained.

Example II

A solution of m-xylylene bromide (3.3 g.) in absolute ethanol (50 cc.) was added to a solution of 3-(dimethylcarbamyloxy)-pyridine (5.0 g.) in absolute ethanol (10 cc.). The resulting solution was refluxed for 24 hours, followed by removal of the solvent in vacuum on a water-bath. The residual oil was dissolved in the minimum amount of absolute ethanol and precipitated with ethyl ether. This purification procedure was repeated twice more, then the oil was separated and dried at 77° C. over P2O5 at 1 mm. pressure. A brittle, hygroscopic, amorphous solid resulted (3 g.) which was the desired α,α'-(1,3-xylene)-bis-[1-(3-dimethylcarbamyloxy)-pyridinium bromide].

Example III

A solution of o-xylylene bromide (2.8 g.) in absolute ethanol (75 cc.) was added to a solution of 3-(N-methyl-N-4-chlorophenylcarbamyloxy)-pyridine (6.92 g.) in absolute ethanol (25 cc.). The resulting solution was refluxed for 6 hours. The solvent was then removed by evaporation in vacuum. The residual oil was treated three consecutive times by a process consisting of dissolving the oil in a minimum amount of absolute ethanol followed by precipitation of the oil by addition of excess of ethyl ether. The purified oil was carefully isolated by decantation and dried at 50° C. in vacuum (0.05 mm.) over P2O5. A white, brittle amorphous, hygroscopic solid was obtained (6.8 g.) which was the desired α,α'-(1,2-xylene)-bis-[3-(N-methyl-N-4-chlorophenylcarbamyloxy)-pyridinium bromide].

Example IV

A solution of o-xylylene bromide (3.54 g.) in absolute ethanol (100 cc.) was added to a solution of 3-(3-oxapentamethylene)carbamyloxypyridine (3-(N-4-morpholino)carbamyloxypyridine) (6.97 g.) in absolute ethanol (35 cc.). The resulting solution was refluxed for 6 hours and the reaction mixture was worked up as in Example III. The yield of 8.3 g. of amorphous, hygroscopic solid was obtained which was the desired α,α'-(1,2-xylene)-bis-3-[3-(oxapentamethylene)-carbamyloxy]-pyridinium bromide.

Example V

A solution of o-xylylene bromide (3.0 g.) in absolute ethanol (85 cc.) was added to a solution of 3-(N-methyl-N-benzyl)-carbamyloxypyridine (7.0 g.) in absolute ethanol (30 cc.). The resulting solution was refluxed for 6 hours and the reaction mixture was worked up in a manner analogous to that described under Example III. A yield of 6.9 g. of amorphous, hygroscopic solid was obtained which was the desired α,α'-(1,2-xylene)-bis-[3-(N-benzyl-N-methylcarbamyloxy)-pyridinium bromide].

Example VI

A solution of o-xylylene bromide (3.3 g.) in absolute ethanol (100 cc.) was added to a solution of 3-(dimethylcarbamyloxy)-6-methylpyridine (5.6 g.) in absolute ethanol (25 cc.). The resulting solution was refluxed for 6 hours. The solvent was then evaporated in vacuum. The residual solid was dissolved in the minimum volume of absolute alcohol and the solution treated with ethyl ether (200 cc.) whereupon an oil separated containing some crystals. The solvent was decanted and the residue was dissolved in absolute ethanol (20 cc.) and treated with ethyl ether (40 cc.), making sure that the mixture was boiling during the addition. Upon cooling, a colorless crystalline solid separated which was collected and dried in a vacuum desiccator over concentrated sulfuric acid. A yield of 4.2 g. of the solid, M. P. 148–153° C., which was the desired α,α'-(1,2-xylene)-bis-[3-(dimethylcarbamyloxy)-6-methylpyridinium bromide], were obtained.

Example VII

A solution of mesitylene tribromide (0.329 g.) (prepared according to the method described in Ann. de Chim. et Phys., 6, 1885, page 86) in hot absolute ethanol (20 cc.) was added to a solution of 3-(dimethylcarbamyloxy)-pyridine (0.652 g.) in absolute ethanol (20 cc.). The resulting solution was refluxed for 6 hours and then the solvent was evaporated in vacuum. The residue was taken up in absolute ethanol (4 cc.) and the solution was treated with ether (60 cc.). The upper layer was separated and discarded. This process of purification with ethanol and ether was repeated twice more. The final, residual oil was dried in vacuum on the water-bath heated up to 60° C. A yield of 0.465 g. of hygroscopic, amorphous solid was obtained which was the desired α,α',α''-mesitylene-tris-[3-(dimethylcarbamyloxy)-pyridinium bromide].

Further examples of pyridol esters and quaternizing halides from which corresponding compounds of my invention may be prepared by the following procedures described in the above examples are as follows:

*Pyridol esters.*— 3-diphenylcarbamyloxypyridine; 3-dibenzylcarbamyloxypyridine; 3-tetramethylenecarbamyloxypyridine; 2,6-dimethyl-3-dimethylcarbamyloxypyridine; 3-dimethylcarbamyloxy-2,4,6-trimethylpyridine; 3-(3-thiapentamethylene)carbamyloxypyridine; 3-(3-azapentamethylene)carbamyloxypyridine.

*Quaternizing halides.*—1,4-(bis-β-bromoethyl)benzene; 1,2-(bis-α-bromopropyl)benzene; 1,4-(bis-chloromethyl)-naphthalene; 2,2'-(bis-bromomethyl)biphenyl.

Since certain changes may be made in the compounds above described without departing from

I claim:
1. 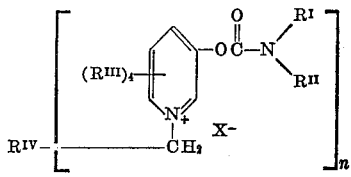

Wherein $R^I$ denotes a radical selected from the group consisting of lower alkyl, benzyl, and chlorophenyl radicals, $R^{II}$ denotes a radical selected from the group consisting of lower alkyl radicals and $R^I$ and $R^{II}$ together with the nitrogen form a cyclic ring having four methylene groups interrupted by oxygen; $R^{III}$ denotes a member selected from the group consisting of hydrogen and lower alkyl radicals; $R^{IV}$ denotes a benzene ring, X denotes a halogen and $n$ denotes an integer not less than two and not greater than three.

2. The compound $a,a'$-(1,2-xylene)-bis-[1-(3-dimethylcarbamyloxy)-pyridinium bromide].

3. The compound $a,a'$-(1,3-xylene)-bis-[1-(3-dimethylcarbamyloxy)-pyridinium bromide].

4. The compound $a,a'$-(1,2-xylene)-bis-[3-(N-methyl-N-4-chlorophenylcarbamyloxy)-pyridinium bromide].

5. The compound $a,a',a''$-mesitylene-tris-[1-(3-dimethylcarbamyloxy)-pyridinium bromide].

EMILE H. SAKAL.

References Cited in the file of this patent
UNITED STATES PATENTS

| Number | Name | Date |
|---|---|---|
| 2,489,247 | Wuest | Nov. 22, 1949 |
| 2,553,994 | Wuest | May 22, 1951 |
| 2,572,579 | Urban | Oct. 23, 1951 |